(12) United States Patent
Maxwell et al.

(10) Patent No.: US 6,428,035 B1
(45) Date of Patent: Aug. 6, 2002

(54) PORTABLE MOTORCYCLE TRAILER

(76) Inventors: Robert L. Maxwell, 2852 Waterford Dr., N., Deerfield Beach, FL (US) 33442; Glen V. Maxwell, 2021 20th La., Greenacres, FL (US) 33463

( * ) Notice: Subject to any disclaimer, the term of this patent is extended or adjusted under 35 U.S.C. 154(b) by 0 days.

(21) Appl. No.: 09/721,219

(22) Filed: Nov. 22, 2000

Related U.S. Application Data

(63) Continuation of application No. 09/248,882, filed on Feb. 11, 1999, now abandoned.

(51) Int. Cl.[7] ................................................ B62D 63/06
(52) U.S. Cl. ........................................ 280/656; 280/789
(58) Field of Search ................................ 280/656, 789, 280/402, 415.1, 416, 418

(56) References Cited

U.S. PATENT DOCUMENTS

| | | | | |
|---|---|---|---|---|
| 3,625,545 A | * | 12/1971 | Somers | 280/400 |
| 3,997,186 A | * | 12/1976 | Pottorff | 280/402 |
| 4,488,735 A | * | 12/1984 | Hehr | 280/656 |
| 4,763,914 A | * | 8/1988 | Lemmons | 280/401 |
| 5,035,012 A | * | 7/1991 | Westrich | 5/139 |
| 5,228,712 A | * | 7/1993 | Speier | 280/401 |
| 5,387,001 A | * | 2/1995 | Hull et al. | 280/402 |
| 5,570,898 A | * | 11/1996 | Albert | 280/656 |
| 5,607,176 A | * | 3/1997 | Leib et al. | 280/656 |
| 5,794,959 A | * | 8/1998 | Scheef, Jr. | 280/400 |
| 5,906,386 A | * | 5/1999 | Baker et al. | 280/404 |
| 5,984,339 A | * | 11/1999 | Guild | 280/402 |

* cited by examiner

Primary Examiner—J. J. Swann
Assistant Examiner—J. Allen Shriver
(74) Attorney, Agent, or Firm—Akerman Senterfitt

(57) ABSTRACT

A trailer comprises a front member, a center member, two wheel members, and an axle member. The front member is adapted to be removably attached to a towing vehicle. The center member is detachably connected to the front member. Each of the two wheel members include a wheel, and the axle member is detachably connected to the center member and to the wheel members. Channel sections can be attached to at least two of the members with the channel sections combining to create a channel that is adapted for receiving a cycle. The trailer can also include a ramp rotatably attached to the axis member. When the ramp is in a lower position, the ramp defines a path for communicating the cycle from the ground to the channel.

12 Claims, 3 Drawing Sheets

PORTABLE MOTORCYCLE TRAILER

CROSS REFERENCE TO RELATED APPLICATIONS

This application is a continuation of U.S. application Ser. No. 09/248,882, filed on Feb. 11, 1999, now abandoned.

STATEMENT REGARDING FEDERALLY SPONSORED RESEARCH OR DEVELOPMENT (Not Applicable)

BACKGROUND OF THE INVENTION

1. Field of the Invention

This invention relates to the field of motor vehicle accessories. More particularly, this invention relates to a new and improved motorcycle trailer capable of being easily assembled, disassembled and stored.

2. Description of Related Art

Until recently, not only were motorcycle trailers heavy, they were also permanently assembled. These types of motorcycles trailers had several problems including that of being difficult to store. For example, in most northern climates, for only a few months out of the year is it possible for most people to ride a motorcycle. During the months the motorcycle cannot be ridden, the motorcycle and motorcycle trailer need to be stored, preferably without incurring storage fees. However, if the trailer cannot be stored, for example in a sheltered location, the trailer must be left out in the elements for many months. Not only does this expose the trailer to the detrimental effects of the elements, the trailer has a much higher chance of being stolen.

Another problem occurs when the trailer must be transported. Since the trailer cannot be broken down, a vehicle capable of towing is needed to tow the trailer. Thus, simpler methods of transporting the trailer, such as in the back seat of a compact car or as check-in luggage on an airplane are not possible.

Recently, however, lightweight trailers capable of being stored have been introduced. These trailers tend to be collapsible, tilting, or folding, and some have been reputed to be small enough to be stored within the trunk of some, but not all vehicles. For those trailers that can be broken down, the trailer can now be stored in a garage, but not in such locations as a closet, attic, or under a bed. The ability to easily store the trailer also facilitates transportation because the trailer can now be placed into transport devices that were impractical to be used with a fully assembled trailer.

Notwithstanding their advantages over permanently assembled trailer, storable trailers still have problems. One such problem is that these trailers have been created with a very small distance between the wheels, i.e. wheel base. The small wheel base is inherently less stable than larger wheel bases as a trailer with a small wheel base becomes increasingly dangerous as towing speed increases.

Another problem associated with some storable trailers is that they require special tools to be assembled and disassembled. In the situation where these tools have been lost or are otherwise unavailable to the operator, the trailer cannot be assembled and disassembled. Consequently, what was once a storable trailer has now become a trailer incapable of being disassembled, and thus, stored. Therefore, a trailer that was once capable of being disassembled still faces the same problems as permanently assembled trailers.

A final problem occurs with a group of people on a trip in which all of them are riding motorcycles and they have no automobiles or trucks traveling along. In such a situation, even those motorcycle trailers that can fold up or be broken down into large pieces cannot be carried on a motorcycle. Thus, the trailer cannot be carried along with the group so as to be available for use by one motorcycle for towing another motorcycle in an emergency.

SUMMARY OF THE INVENTION

It is an object of this invention to provide a motorcycle trailer capable of being disassembled and stored in a bag capable of being transported in the luggage compartment of any passenger vehicle, in the back seat of a passenger vehicle or in the back of a pickup truck.

It is a further object of the invention to provide a motorcycle trailer capable of being disassembled into pieces which are small enough and light enough to be carried collectively by a number of motorcycles without inconvenience or risk to the riders.

It is another object of this invention to provide a motorcycle trailer capable of being assembled and disassembled without the use of any tools.

It is yet another object of this invention to provide a motorcycle trailer capable of being disassembled into no more than five main pieces.

It is yet another object of this invention to provide a motorcycle trailer which can be easily assembled and disassembled and which can be easily stored in small spaces.

In accordance with the invention, these an other objects are accomplished by providing a trailer comprising a front member, a center member, two wheel members, and an axle member. The front member is adapted to be removably attached to a towing vehicle. The center member is detachably connected to the front member. Each of the two wheel members include a wheel, and the axle member is detachably connected to the center member and to the wheel members. Channel sections can be attached to at least two of the members with the channel sections combining to create a channel that is adapted for receiving a cycle. The trailer can also include a ramp rotatably attached to the axis member. When the ramp is in a lower position, the ramp defines a path for communicating the cycle from the ground to the channel.

The trailer can be adapted so that the largest inside dimension of a container defines a longest dimension of any of the members with the container being capable of storing the members when disassembled. The container, for example can be a bag of a compartment within the towing vehicle. Preferably, the largest inside dimension is approximately 42 inches. Each member also has a preferable weight not greater than approximately 30 pounds.

The trailer can also include quick disconnects to aid in the quick attachment and/or disassembly of the members to one another. One example of a quick disconnect that does not require tools for assembly is a combination of a pin and clip. The pin and clip can be used when the ends of two members interfit and overlap one another. These ends provide two pair of opposing holes that align when the members are connected. The pin can then be inserted through the holes with the clip later attached to the end of the pin to prevent the pin from being removed from the holes.

The trailer preferably has a wheel base distance at least greater than twice the longest dimension of any of the members. The wheel base distance is defined as a greatest distance between any two points on the wheels that are contacting the ground.

BRIEF DESCRIPTION OF THE DRAWINGS

Presently preferred embodiments of the inventive arrangements are shown in the drawings, it being understood, however, the inventive arrangements are not limited to the precise arrangements and instrumentalities shown.

DETAILED DESCRIPTION OF THE PREFERRED EMBODIMENTS

Figure 1:
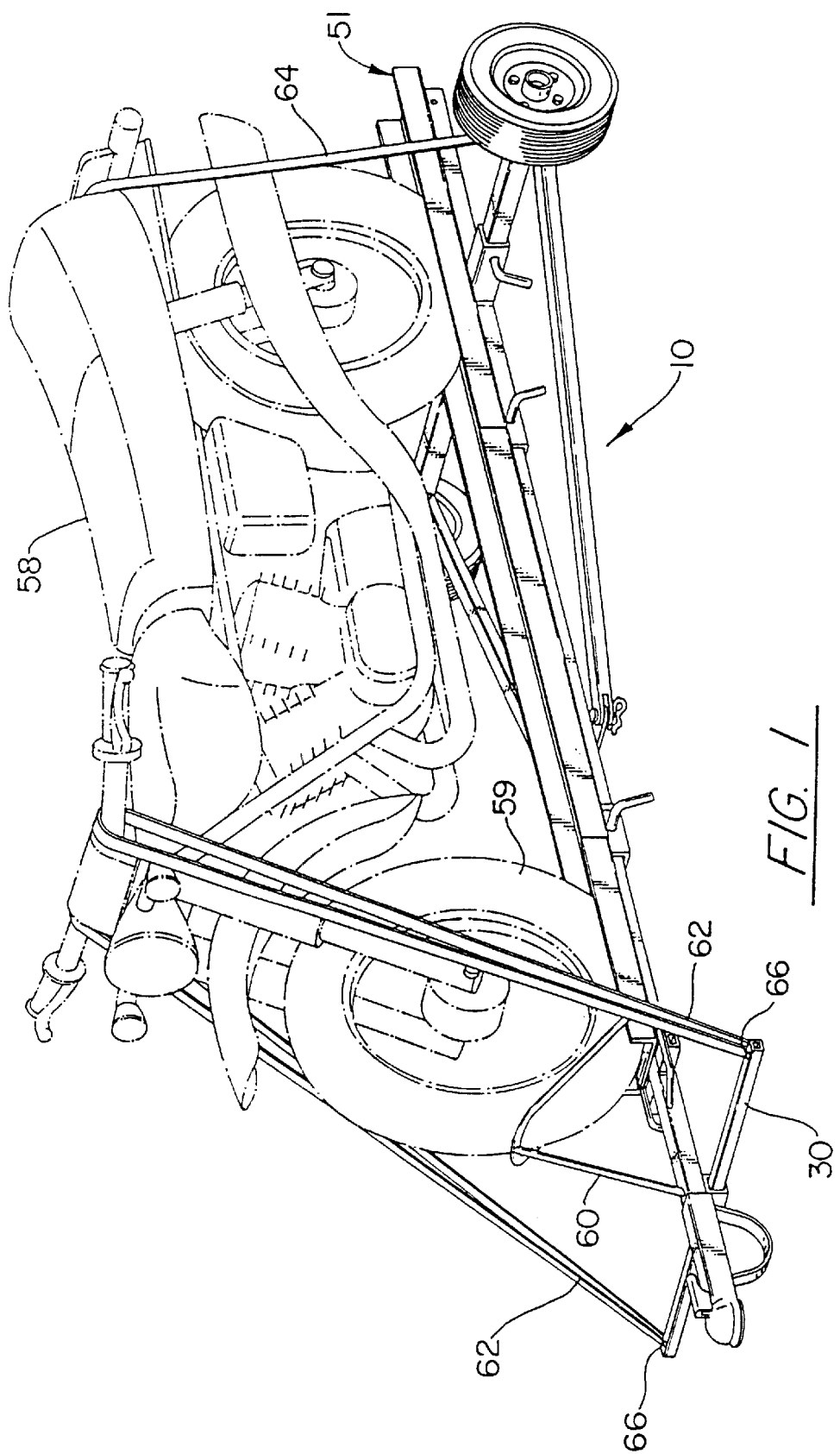
FIG. 1 is a right front top perspective of a portable motorcycle trailer.
Figure 2:
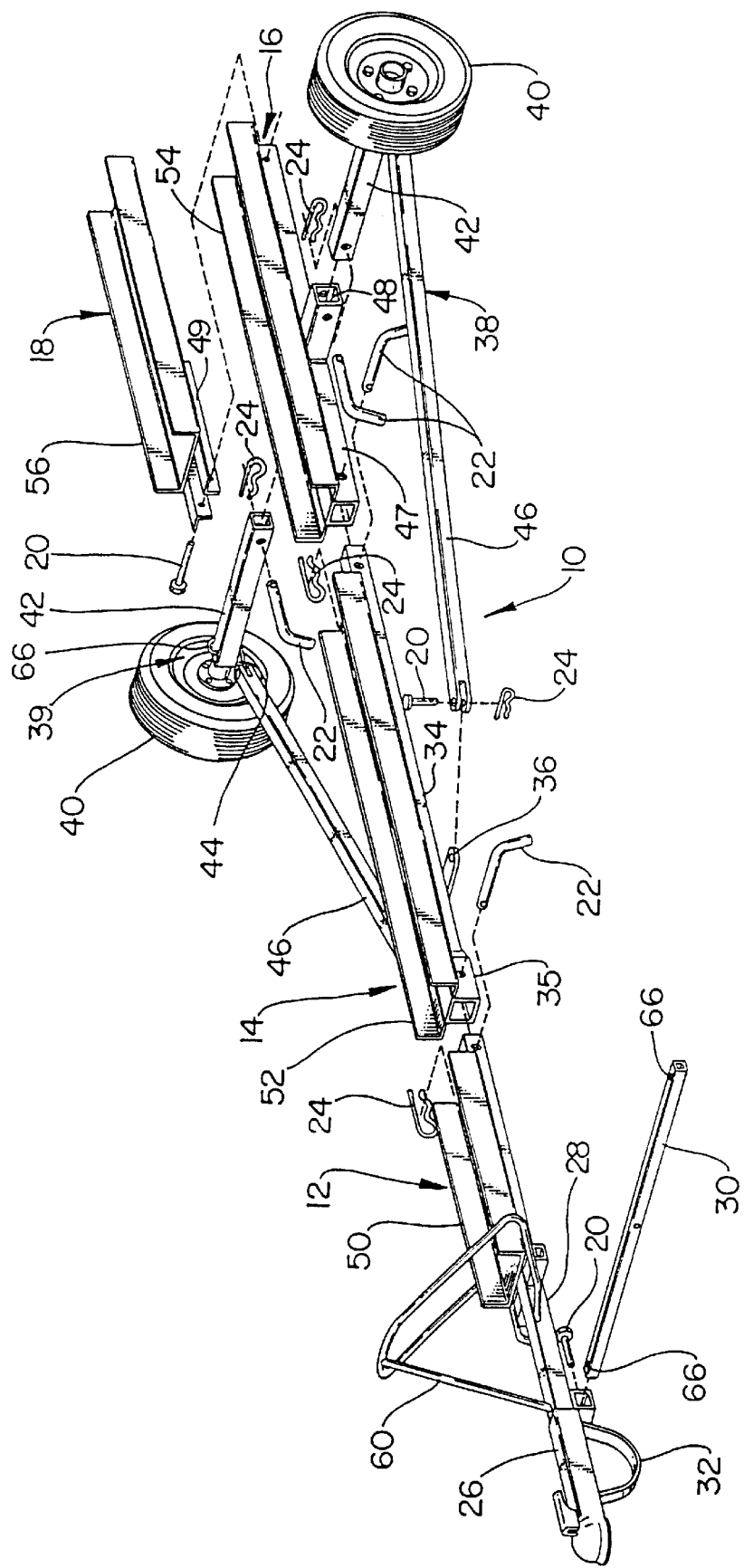
FIG. 2 is an exploded view of FIG. 1.

FIGS. 1 and 2 illustrate a portable motorcycle trailer according to the invention. The trailer 10 comprises a front member 12, a center member 14, an axle member 16 and two wheel members 38, 39. When connected, the axle member 16 and the two wheel members 38, 39 form the wheel and axle structure of the trailer 10. Advantageously, by using three members 16, 38, 39 to form the wheel and axle structure instead of just one, a longer distance between the wheels can be achieved in an assembled trailer. This longer distance allows the trailer 10 to be towed more safely at higher speeds.

The members 12, 14, 16, 38 and 39 form the structure of the trailer 10, and are detachably connected to one another so as to facilitate quick assembly and disassembly of the trailer 10. Although in the presently preferred embodiment pins 22 and clips 24 are used to detachably connect the members 12, 14, 16, 38, 39 to one other, the invention is not limited in this manner. These Pins 22 and clips 24 will be discussed in more detail with the discussion of each member 12, 14, 16, 38 and 39.

The front member 12 includes a coupler 26, a front tongue section 28 and a front tie down bar 30. The coupler 26 connects the trailer 10 to a towing vehicle, not shown. Couplers are well known in the art of towing. Required on all trailers, but omitted from the figures for purposes of clarity, are chains. Chains are attached to the front member and are detachably connected to the towing vehicle. The chains are a backup connection for purposes of safety, in case the coupler 26 fails.

The coupler 26 is fixedly attached to the front tongue section 28. Any means or method, riveting or bolting for example, of fixedly attaching the coupler 26 to the front tongue section 28 is acceptable. The presently preferred method of attachment is welding the coupler 26 to the front tongue section 28. The front tongue section 28 is preferably both lightweight, for ease of portability, and strong, to support the weight of the motorcycle.

The front tie down bar 30 is transverse to the front tongue section 28 and is detachably connected to a set of support angles on the front tongue section 28. Any means or method, bolting or clipping for example, of detachably connecting the front tie down bar 30 is acceptable. The presently preferred means of connecting the front tie down bar 30 is with a pin 20 and clip 24. The pin 20 extends through holes in the front tie down bar 30 and holes in the support angles. A clip, not shown for purposes of clarity, is inserted into a hole in the distal end of the pin 20. Once the clip is inserted into the pin 20, the pin 20 is prevented from moving in either direction.

The front member 12 can also include a resting member 32 extending below the coupler 26 and contacting the ground when the trailer 10 is not attached to the towing vehicle. Use of the resting member 32 prevents the coupler 26 from being damaged after being placed or dropped onto the ground after the trailer 10 is detached from the vehicle. Many types of resting members 32 are well known in the art of trailers and can be used with the invention. The presently preferred resting member 32 is U-shaped with both distal ends being welded to the front of the front tongue section 28.

The center member 14 includes a center tongue section 34, a sleeve 35, and front stabilizer tabs 36. The center member 14 is detachably connected at one end to the front member 12 and at the other end to the axle member 16. Any means or method of detachably connecting, for example bolting or clipping, the center member 14 to the front or axle member 12, 16 is acceptable. The presently preferred means of connecting the center member 14 to the front member 12 or axle member 16 is with a pin 22 and clip 24.

With the presently preferred means of connecting, assembling the center member 14 and the front member 12 requires the center tongue section 34 and the front tongue section 28 each to be dimensioned to be partially slid into sleeve 35. The sleeve is then permanently attached to the center tongue section 34 and detachably connected to the front tongue section 28. The presently preferred method of attaching the sleeve 35 to the center tongue section 34 is by welding.

To detachably connect the front tongue section 28 to the sleeve 35, the front tongue section 28 is slid into the sleeve 35 until four holes are all aligned, two holes each in the sleeve 35 and the front tongue section 34. A pin 22 is then extended through the four holes and a clip 24 is inserted into a hole in the distal end of the pin 22. Once the clip 24 is inserted into the pin 22, the pin 22 is prevented from moving in either direction. To disconnect the front tongue section 28 from the sleeve 35, the clip 24 must first be removed from the pin 22, the pin 22 must then be removed from the four holes, and finally, the front tongue section 28 is then able to be slid out of the sleeve 35.

In addition, with the presently preferred means of connecting, assembling the center member 14 and the axle member 16 requires an axle tongue section 47 of the axle member 16 to be similarly dimensioned to that of the sleeve 35 such that the axle tongue section 47 can be partially slid over the center tongue section 34. After the axle tongue section 47 is partially slid over the center tongue section 34 and four holes are all aligned, two holes each in both the center and axle sections 34, 47, a pin 22 is inserted through the four holes and a clip 24 is inserted into a hole in the distal end of the pin. Once the clip 24 is inserted into the pin 22 the pin 22 is from moving in either direction.

Fixedly attached to the center tongue section 34 are two front stabilizer tabs 36 disposed opposite each other. The front stabilizer tabs 36 are also transverse to and extend outwardly from the center tongue section 34.

Besides an axle tongue section 47, the axle member 16 also includes a cross tongue section 48. The axle tongue section 47 bisects and is fixedly attached to the cross tongue section 48. The cross tongue section 48 is used to detachably connect the axle member 16 to the two wheel members 38, 39.

The two wheel members 38, 39 are mirror images of each another and each preferably comprise a wheel 40 and strut 42 rotationally connected, a rear stabilizer tab 44, and a stabilizer bar 46. Many means of rotationally connecting a wheel to a non-rotating structure are well known in the art and this invention is not limited to any of those means. The stabilizer bars 46 can be omitted provided that the connection between the axle member 16 and the wheel members 38, 39 is otherwise reinforced. Examples of situations in which stabilizer bars 46 can be beneficially used are when the cycle to be towed is heavy, when the road to be traveled is bumpy, or when the trailer 10 is to be towed at high speeds.

If included, the stabilizer bar 46 is hingedly connected to the rear stabilizer tab 44 which is fixedly attached to the strut 42. Any hinging connection between the rear stabilizer tab 44 and the stabilizer bar 46 is acceptable so long as the stabilizer bar 46 can pivot to be substantially parallel to the strut 42 and can pivot to a position so as to be connected to the front stabilizer tab 36.

At the opposite distal end to where the stabilizer bar 46 connects to the rear stabilizer tab 44 the stabilizer bar 46 is detachably connected to the front stabilizer tab 36. Any means or method of detachably connecting, for example bolting or clipping, the stabilizer bar 46 to the front stabilizer tab 36 is acceptable. The presently preferred means of connecting the stabilizer bar 46 to the front stabilizer tab 36 is with a pin 20 and clip 24. The pin 20 extends through holes in both the stabilizer bar 46 and front stabilizer tab 36 and is prevented from being removed after the clip 24 is inserted into a hole in the distal end of the pin 20.

Any means or method of detachably connecting, for example bolting or clipping, the wheel members 38, 39 to the axle member 16 is acceptable. The presently preferred means of connecting the wheel members 38, 39 to the axle member 16 is with a pin 22 and clip 24.

With the presently preferred means of connecting, assembling wheel members 38, 39 and the axle member 16 requires that the strut 42 be dimensioned to be partially slid into the cross tongue section 48. The strut 42 is slid into the cross tongue section 48 until four holes are all aligned, two holes each in both strut 42 and cross tongue sections 48. A pin 22 is then extended through the four holes and a clip 24 is inserted into a hole in the distal end of the pin 22. Once the clip 24 is inserted into the pin 22 the pin 22 is prevented from moving in either direction.

Disposed on top of the front, center and axle members 12, 14, 16 and traversing the length of the trailer 10 is a channel 51. The channel 51 is U-shaped and dimensioned to accept the wheels of a motorcycle 58. For ease of disassembly, the channel 51 is broken into four sections: a front channel 50, a center channel 52, an axle channel 54, and a rear channel 56. Each channel 50, 52, 54 is then fixedly attached to a corresponding member 12, 14, and 16. Any means, welding for example, of fixedly attaching the channel sections 50, 52 and 54 to the members 12, 14 and 16 is acceptable. The presently preferred means of connection is to rivet the channel sections 50, 52 and 54 to support angles which are attached to the members 12, 14 and 16.

An optional feature of the trailer 10 is a ramp 18 detachably and/or pivotably attached to the axle member 16. The ramp 18 is formed by a channel section 56 affixed to angle brackets 49, for example by welding or rivets. The presently preferred method of detachably and pivotably attaching the ramp 18 to the rear member is with a pin 20 and clip 24. When the motorcycle 58 is to be loaded into or unloaded from the trailer 10, the ramp 18 is to be positioned to incline downward from the axle member 16 to the ground. This positioning allows the motorcycle 58 to be easily loaded or unloaded. When the ramp 18 is not needed, the ramp 18 can either be removed and stored elsewhere, or the ramp 18 can be positioned to incline upward from the axle member 16.

Once the motorcycle 58 is within the channel 51, the motorcycle 58 is held in place with a wheel holder 60, front straps 62, and a rear strap 64. The wheel holder 60 is attached to the front member 12 and is dimensioned to snugly hold the front wheel 59 of the motorcycle 58. The straps 62, 64 wrap around the motorcycle 58 and prevent the motorcycle 58 from moving relative to the trailer 10. The straps 62, 64 are then connected to the trailer 10. Any means of connecting the straps 62, 64 to the trailer 10 is acceptable. The presently preferred means of connection is with two strap rings 66 located on the front tie down bar 30 and one strap ring 66 located on each strut 42. The front straps 62 are connected to the front tie down bar 30 and the rear strap 64 is connected to the struts 42.

The tongue sections 28, 34, 47, 48 and struts 42 are preferably made with material that is both lightweight and strong. The presently preferred tongue sections 28, 34, 47, 48 and struts 42 are constructed using square, hollow stock material of steel or aluminum, or a combination of both, or similar material. However, the invention is not limited to this configuration or type of materials. Any materials that combine the qualities of strength and being lightweight are acceptable.

If constructed from steel, the trailer 10 preferably weighs less than 130 pounds and has a load capacity of 1,500 pounds. The trailer 10 can now be moved easily because it has such little weight. Also, when the trailer 10 is disassembled, the total weight for any one member is less than 30 pounds. Thus, a single person can easily lift any one member for transporting purposes.

Holders for lights and license plates are required for all trailers in most states; however, the holders for the lights and the license have been omitted in the figures for purposes of clarity.

Figure 3A:
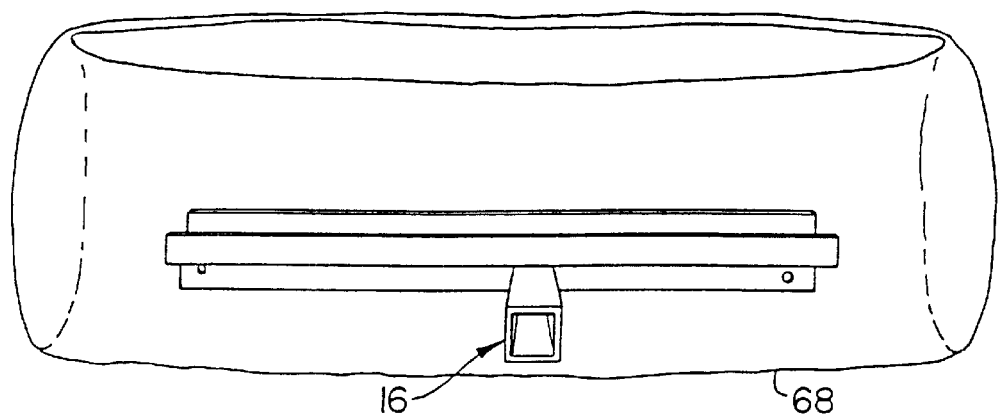
FIG. 3a is a front elevation, partially in section, of an axle member within a bag.
Figure 3B:
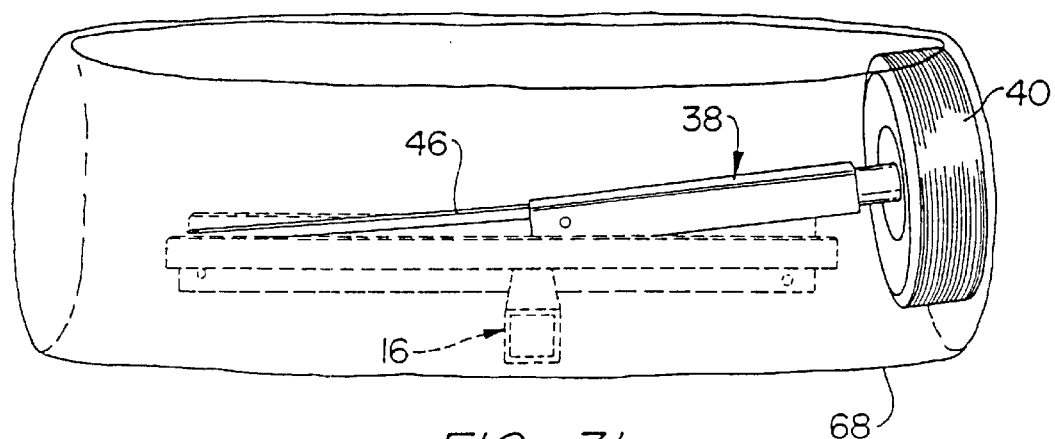
FIG. 3b is a front elevation, partially in section, of an axle member and wheel assembly within the bag; and, FIG. 3c is a front elevation, partially in section, of an axle member, two wheel assemblies and additional structure within the bag.
Figure 3C:
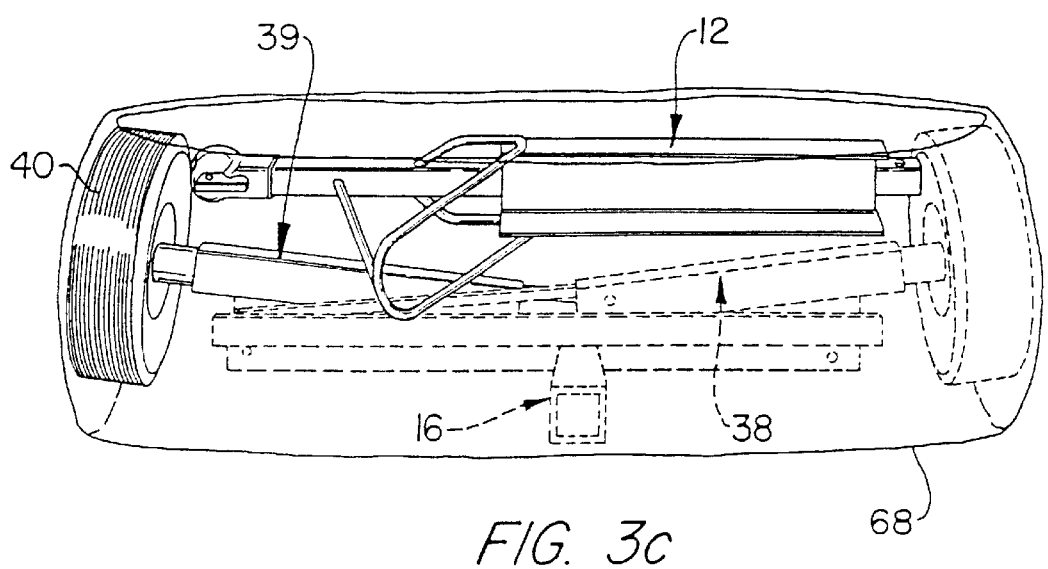

FIGS. 3a, 3b and 3c illustrate how the disassembled trailer 10 is fit within a bag 68. In FIG. 3a, the axle member 16 is shown positioned within the bag 68 such that the long axis of the axle member 16 is substantially parallel to the transverse axis of the bag 68.

In FIG. 3b the left wheel member 38 is shown positioned within the bag 68. However, before the left wheel member 38 is placed within the bag 68, the stabilizer bar 46 must be pivoted such that it is substantially parallel to the transverse axis of the left wheel member 38.

After the left wheel member 38 is positioned within the bag 68, FIG. 3c illustrates the placement of the right wheel member 39 in the bag 68. As with the left wheel member 38, the stabilizer bar 46 on the right wheel member 39 must be pivoted to be substantially parallel to the transverse axis the right wheel member 39.

Once the axle member 16 and two wheel members 38, 39 are placed within the bag 68, the remaining pieces are placed within the bag 68. Significantly, the size of the bag 68 limits the size of each piece being placed within the bag 68. Thus, if a larger bag 68 is used, the pieces being placed within the bag 68 can also be larger. In the presently preferred embodiment of the invention, each piece has a longest dimension not greater than 42 inches. Thus, the interior transverse dimension of the presently preferred bag 68 need not be more than approximately 42 inches.

What is claimed is:

1. A trailer for towing a cycle and capable of being disassembled and reassembled, comprising:

a hitch connector for removable attachment to a towing vehicle;

at least three members removably connectable to one another, each said member including a channel section and a tubular support section, said at least three members being alignable to form a channel for supporting a cycle by interlocking said tubular support sections and including a first member connectable to said hitch connector, a second member connectable to at least one axle portion, said at least one axle portion supporting at least two wheels, and at least one third member connectable between said first and second members;

wherein said at least three members and said at least one axle portion have a longest dimension not greater than an inside dimension of a portable container, wherein said members are stored in said portable container when said members are disassembled.

2. The trailer according to claim 1, wherein said at least three members are connectably alignable to define an axis substantially equidistant between said two wheels.

3. The trailer according to claim 1, wherein said at least one axle portion comprises two axle sub-portions, each axle sub-portion supporting one wheel and connectable to said second member.

4. The trailer according to claim 1, wherein said portable container is a bag.

5. The trailer according to claim 1, wherein said longest dimension is approximately 42 inches.

6. The trailer according to claim 1, wherein all of said members have individual weights not greater than approximately 30 pounds.

7. The trailer according to claim 1, wherein said at least three members at least partially comprise aluminum.

8. The trailer according to claim 1, comprising quick disconnects for attachment of said members to one another.

9. The trailer according to claim 8, wherein each of said quick disconnects comprises:

a first pair of opposing holes defined by a first of said at least three members;

a second pair of opposing holes defined by a second of said members adjacent said first member, all of said holes aligning when said first member is connected to said second member;

interfitting, overlapping ends of said tubular support structures of first and second members;

a pin having a head and inserted through said holes; and, a clip detachably connected to said pin, whereby said head and said clip prevent removal of said pin from said holes.

10. The trailer according to claim 1, further comprising a ramp rotatably attachable to said second member, said ramp in a lowered position defining a path for transporting the cycle from ground to said channel.

11. The trailer according to claim 1, wherein a wheel base distance between said at least two wheels when said trailer is assembled is at least greater than twice said longest dimension of said members, said wheel base distance defined as a greatest distance between any two points contacting ground on said wheels.

12. The trailer according to claim 1, further comprising a tie-down bar attachable to at least one of said members, said tie-down bar adapted to connect to straps that releasably engage the cycle.

\* \* \* \* \*